United States Patent [19]

Ruus

[11] 4,172,468
[45] Oct. 30, 1979

[54] PRESSURE SHOCK ABSORBER FOR OXYGEN-REGULATOR SUPPLY SYSTEM

[75] Inventor: Hans Ruus, Parma Heights, Ohio

[73] Assignee: Emerson Electric Co., St. Louis, Mo.

[21] Appl. No.: 844,457

[22] Filed: Oct. 21, 1977

[51] Int. Cl.² ............................................. F16K 31/12
[52] U.S. Cl. .................... 137/504; 137/509; 91/443
[58] Field of Search ...................... 137/501, 504, 509; 91/443

[56] References Cited

U.S. PATENT DOCUMENTS

| | | | |
|---|---|---|---|
| 3,886,969 | 6/1975 | Shira | 137/509 |
| 3,960,172 | 6/1976 | Blake | 137/504 |
| 3,990,516 | 11/1976 | Christensen | 137/509 X |
| 4,000,684 | 1/1977 | Ruffley | 137/509 X |

*Primary Examiner*—Harold W. Weakley
*Attorney, Agent, or Firm*—Meyer, Tilberry & Body

[57] ABSTRACT

A fluid pressure shock absorbing valve is mounted between an oxygen supply tank and a fluid pressure regulator in a supply system such as that for welding torches. The valve includes a housing slidably supporting a valve member having a head biased to seat in the direction of flow from the tank to the regulator to normally close the valve. The valve member has a central flow passageway extending thereinto from the downstream end, and a restricted passageway extends through the head and opens into the flow passageway to bleed fluid through the head when the latter engages the seat. Radially extending passageways open into the flow passageway downstream from the seat. When the supply tank is opened, flow through the restricted passageway allows for gradual pressurization of the regulator and an eventual build-up of pressure to displace the valve member from the seat to allow full flow past the seat and into the flow passageway through the radial passages.

16 Claims, 4 Drawing Figures

PRESSURE SHOCK ABSORBER FOR OXYGEN-REGULATOR SUPPLY SYSTEM

This invention relates to the art of fluid pressure actuated valves and, more particularly, to a fluid pressure shock absorbing valve between a pressurized fluid supply and a fluid pressure regulator.

The present invention finds particular utility as a safety device between an oxygen supply tank and a fluid pressure regulator in a supply system for welding torches and, accordingly, will be described in detail in connection with such use. At the same time, however, it will be appreciated that the invention can be employed in connection with other fluid supply systems wherein it is desired to eliminate the shock of sudden pressurization of a fluid pressure regulator downstream from a source of fluid under pressure.

Gas torch welding systems generally include a tank of oxygen or other gas at extremely high pressure, and a manually controlled regulator or pressure reduction valve connected between the gas tank and the supply hose leading to the welding torch. The pressure regulator is exposed to sudden pressure shock and high temperature increase when the gas tank valve is opened, and this pressure shock and temperature condition can and often does result in damage to the regulator. Moreover, such pressure shock and high temperature conditions occasionally cause the regulator to burst and/or cause regulator fires, both of which can result in serious injury to personnel handling the equipment.

Accordingly, it becomes desirable to provide a pressure shock absorber arrangement between the gas supply tank and regulator to provide sudden pressurization of the regulator. The only previous effort in this direction known to applicant is the pressure shock absorber valve disclosed in U.S. Pat. No. 2,367,662 to Baxter et al which issued Jan. 23, 1945. The valve in the latter patent includes a valve member slidably supported within a housing for engagement with a valve seat in the direction of flow of gas from a supply tank to a pressure regulator. The valve member is normally biased open by a spring, and is provided with a restricted passageway therethrough to bleed gas from the supply tank to the regulator when the valve member engages the seat. In operation, the supply tank valve is opened and the sudden gas pressure causes the valve member to engage its seat, whereby the supply gas bleeds through the valve member to the regulator. Upon a sufficient build-up of pressure in the regulator, the valve member opens to allow full flow of gas from the supply tank to the regulator.

The valve disclosed in the Baxter et al patent is undesirable for several reasons. In this respect, for example, sudden closing of the normally open valve member causes impact thereof with the valve seat and undesirable wear and possible damage to both the seat and the valve member. More importantly, upon opening of the valve member for full flow upon sufficient pressure build-up in the regulator, such full flow causes drag as a function of flow velocity on the outer surface of the valve member along the entire length thereof, and this drag force tends to close the valve. The closing tendency is against the force of the spring operating in the direction to open the valve and this results in undesirable nonuniform fluid flow characteristics between the supply tank and regulator. In other words, the valve is flow sensitive, and this effects proper functioning of the regulator. Moreover, the normally open characteristic and fluid flow path in the Baxter et al valve often cause the valve to remain open under flow conditions where the valve should close.

In accordance with the present invention, an improved pressure shock absorber valve is provided which advantageously avoids or minimizes the foregoing problems. In this respect, the valve according to the present invention is normally closed, thus avoiding impact between the valve member and valve seat in response to a pressure surge in the direction from the gas supply to the regulator. Further in accordance with the present invention, subsequent opening of the valve following bleeding of gas to the regulator results in full flow of gas through the valve member with reduced drag along the outer surface thereof, thereby minimizing flow drag and the tendency of such flow to close the valve following opening thereof. Still further in accordance with the present invention, the valve member is maintained opened by fluid under pressure between the valve and pressure regulator acting against a biasing force tending to close the valve. By appropriately selecting the biasing force the valve can be biased to close whenever the pressure in the regulator drops to a predetermined magnitude above which an undesirable surge would be imposed on the regulator by flow from the supply tank. Accordingly, for example, if the supply tank is closed following a welding operation and the pressure between the valve and regulator drops to the predetermined magnitude the valve will close. Thus, upon subsequently reopening the supply tank, gas cannot flow freely to the regulator. Accordingly, the regulator is advantageously protected against pressure surges which can effect proper functioning of the regulator and which can over a period of time damage the regulator.

It is accordingly an outstanding object of the present invention to provide an improved fluid pressure shock absorbing valve for use between a source of fluid under pressure and a pressure regulator downstream therefrom.

Another object is the provision of a valve of the foregoing character operable to prevent sudden pressurization of the regulator without restricting proper functioning of the regulator.

Yet another object is the provision of a valve of the foregoing character which is normally closed to full flow in the direction of fluid flow therethrough.

A further object is the provision of a valve of the foregoing character which, when open, minimizes drag forces of fluid flow thereacross tending to close the valve.

Still a further object is the provision of a valve of the foregoing character which is more reliable in use and more efficient in operation than similar devices heretofore provided.

The foregoing objects, and others, will in part be obvious and in part pointed out more fully hereinafter in conjunction with the written description of a preferred embodiment of the invention shown in the accompanying drawings in which.

Figure 1:
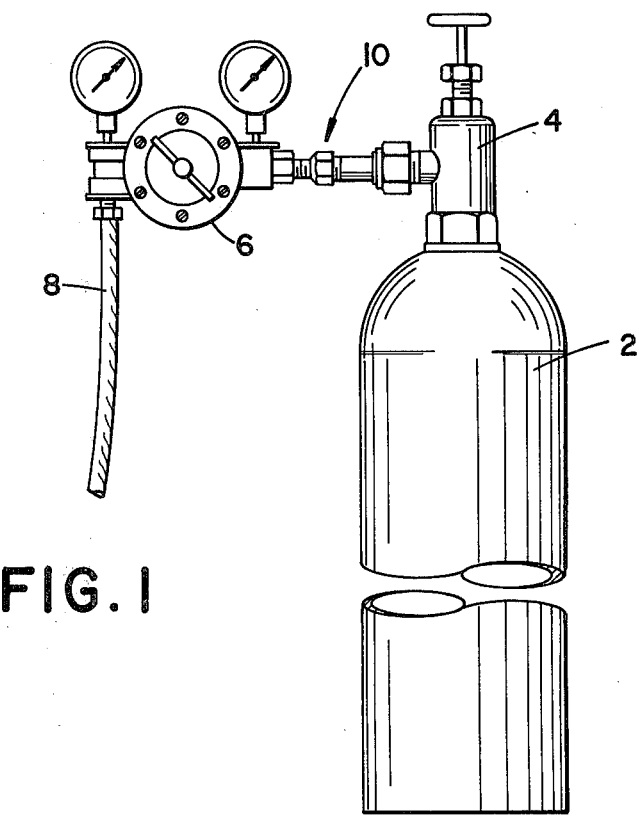
FIG. 1 is a diagrammatic elevation view of a high pressure gas tank and an attached pressure regulator with a pressure shock absorber valve according to the present invention connected between the tank and regulator.

Referring now in greater detail to the drawings wherein the showings are for the purpose of illustrating a preferred embodiment of the invention only and not for the purpose of limiting the invention, FIG. 1 illustrates a high pressure gas tank 2 of the type, for example, used to supply oxygen or the like to a welding system and which tank as is well known includes a manually controlled tank valve 4. As is further well known, a manually controlled regulator or pressure reduction valve 6 is connected between tank 2 and a hose 8 leading to a gas torch, not shown. The pressure shock absorbing valve 10 in accordance with the present invention is connected between tank valve 4 and pressure regulator 6 by suitable fittings.

Figures 2, 3:
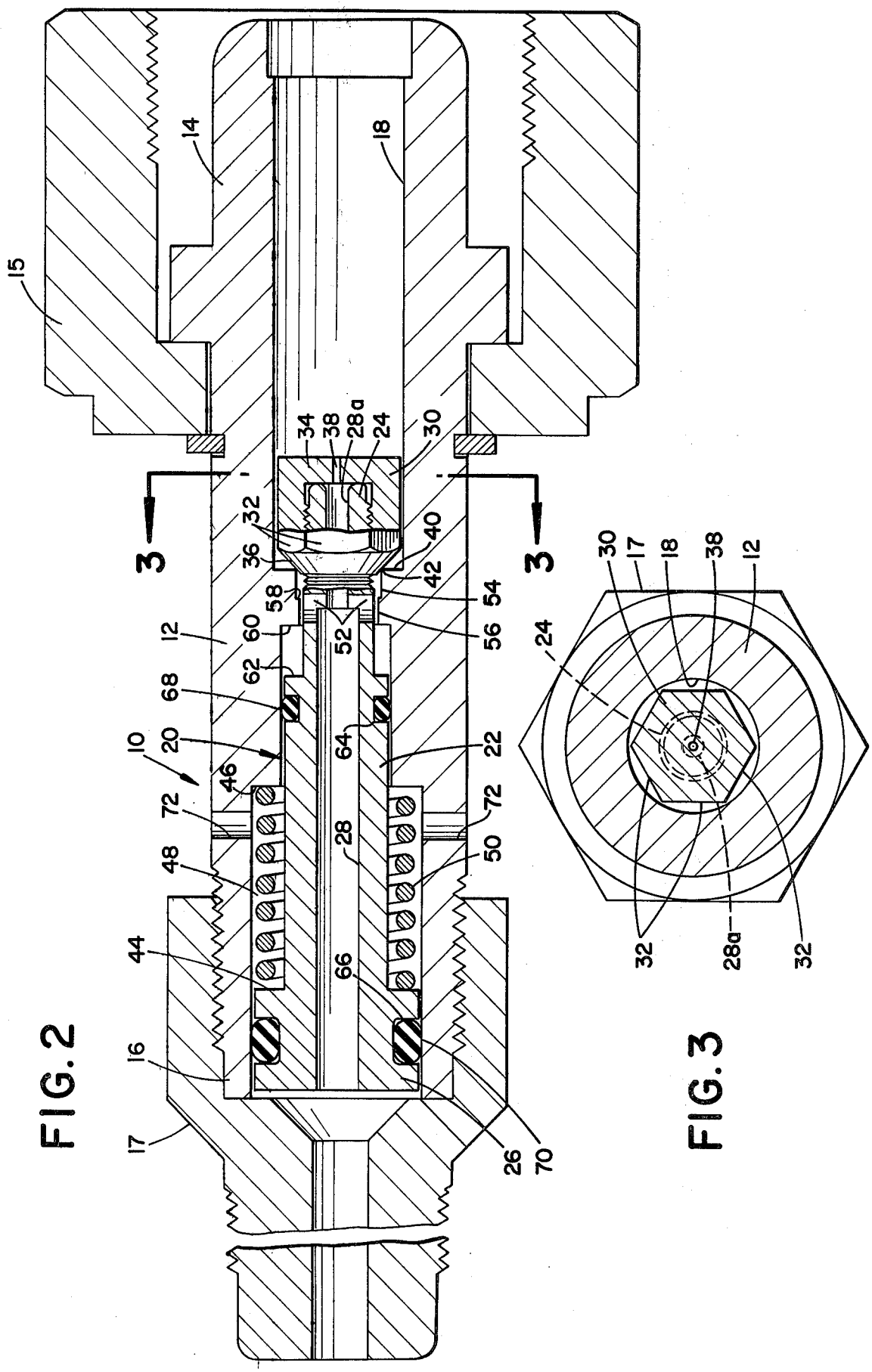
FIG. 2 is an enlarged longitudinal sectional elevation view of the pressure shock absorbing valve.
FIG. 3 is a cross-sectional view of the valve taken alone line 3—3 in FIG. 2; and, FIG. 4 is a detailed sectional elevation view of a portion of the valve and showing the valve in the fully open position.

Referring now in particular to FIGS. 2 and 3 of the drawing, pressure shock absorbing valve 10 includes a housing 12 having an upstream end 14 and a downstream end 16 adapted to be connected, respectively, to gas supply tank 4 and pressure regulator 6 as shown in FIG. 1. For this purpose, upstream end 14 of housing 12 is provided with a standard oxygen tank coupling nut 15, and downstream end 16 of the housing is externally threaded to receive a coupling nipple 17. Accordingly, it will be appreciated that the upstream and downstream ends of housing 12 are with respect to the direction of fluid flow through the valve.

Housing 12 is provided with a bore 18 extending axially therethrough and which bore of course has upstream and downstream ends corresponding to ends 14 and 16 of the housing. Bore 18 is circular in cross section and slidably receives and supports a pressure responsive valve element 20. In the embodiment disclosed, valve element 20 includes a body portion 22 having upstream and downstream ends 24 and 26, respectively, and a primary fluid flow passageway 28 extending through the body portion between the ends thereof. Valve element 20 further includes a head member 30 removably mounted on upstream end 24 of body portion 22. Head member 30 is of a form similar to a hexagonal cap nut and is internally threaded for engagement with external threads on end 24 of body portion 22. Further, head member 30 includes longitudinally extending planar sidewalls 32, and an end wall 34 extending transversely across upstream end 28a of flow passage 28 in body portion 22. Head member 30 further includes a frusto-conical wall 36 extending circumferentially thereabout and facing in the downstream direction with respect to bore 18. End wall 34 of head member 30 is provided with a restricted passageway 38 extending therethrough and communicating the upstream end of bore 18 with the primary flow passageway 28 for the purpose set forth hereinafter.

Bore 18 includes a shoulder 40 having a circular inner periphery providing a valve seat 42. Seat 42 is engaged by wall 36 of head member 30 in the direction of fluid flow through bore 18 to close the bore, and valve element 20 is biased in the downstream direction to normally close bore 18 in this manner. More particularly, downstream end 26 of body portion 22 is provided with a shoulder 44 and bore 18 is provided with a shoulder 46 axially opposed and spaced apart from shoulder 44. Shoulders 44 and 46 together with the inner surface of bore 18 and the outer surface of body portion 22 of valve element 20 define a radial space 48 extending circumferentially about the valve element, and a compression spring 50 is received in space 48 with its opposite ends in abutting engagement with shoulders 44 and 46. Thus, spring 50 biases valve element 20 in the downstream direction and accordingly biases wall 36 of head member 30 into engagement with seat 42.

Body portion 22 of valve element 20 is provided with diametrically opposed radial passageways 52 downstream from head member 30 and communicating the corresponding portion of bore 18 with primary flow passage 28 in body portion 22 of the valve element. For the purpose set forth more fully hereinafter, bore 18 is provided with a circumferential surface 54 extending axially and downstream from valve seat 42 and a circumferential surface 56 stepped radially inwardly from and extending axially downstream from surface 54 in closely spaced relationship radially with the corresponding portion of upstream end 24 of body portion 22 of the valve element. Surfaces 54 and 56 provide a shoulder 58 and radial passageways 52 are axially located to radially underlie wall portions 54 and 56 when valve element 20 is closed. Further, bore 18 is provided with a shoulder 60 at the downstream end of surface 56 and body portion 22 is provided with a shoulder 62 axially opposed with respect to shoulder 60. Shoulders 60 and 62 cooperate to stop displacement of valve element 20 in the opening direction which is to the right in FIG. 2. Accordingly, it will be appreciated that when valve element 20 moves in the opening direction radial passages 52 move toward valve seat 42 and are thus positioned for fluid flow to readily proceed therethrough and into primary flow passageway 28.

In order to seal against fluid flow leakage between the outer surface of valve element 20 and the inner surface of bore 18, body portion 22 is provided with radially outwardly open recesses 64 and 66 extending circumferentially thereabout and receiving corresponding resilient O-ring seals 68 and 70, respectively, which accordingly are carried by the valve element and slidably engage the inner surface of bore 18. Recess 64 is located downstream from radial passageways 52 so as to slidably engage bore 18 between shoulders 46 and 60 thereof, and recess 66 is located in downstream end 26 of body portion 22 of the valve element and downstream from shoulder 44 of the body portion. In order to prevent any gas pressure build-up in space 48 between O-ring seals 68 and 70 in the event of gas leakage past the seals, space 48 is vented to atmosphere by diametrically opposed vent passages 72 extending through housing 12.

From the foregoing description, it will be appreciated that the direction of gas flow through the valve is to the left as seen in FIG. 2. It will be further appreciated that spring 50 biases valve element 20 in the direction of fluid flow to normally hold wall 36 of head member 30 against seat 42 to close bore 18 against flow around the head member and past seat 42. Upon opening the gas supply valve, the sudden surge of gas pressure into the upstream end of bore 18 impinges upon head member 30 and advantageously increases the seating force of wall 36 against seat 42 to assure against any gas flow along the head member and across the seat. Restricted passageway 38 in end wall 34 of the head member bleeds the fluid from the supply tank through the head member to primary passageway 28 and thence to the pressure regulator so as to gradually build-up pressure in the regulator and thus avoid sudden pressurization thereof.

When the pressure in the regulator reaches a magnitude where the shock will no longer be significant, which magnitude is generally about 40 to 45 percent of the supply pressure, the force on the downstream working area of valve element 20 will overcome the closing force provided by spring 50 and the supply gas pressure acting against head member 30. When the closing force is overcome in this manner, valve element 20 is displaced to the right in FIG. 2 and to the position shown in FIG. 4 unseating valve head wall 36 from seat 42 and thus allowing full flow of supply gas past head 30 and across seat 42.

Figure 4:
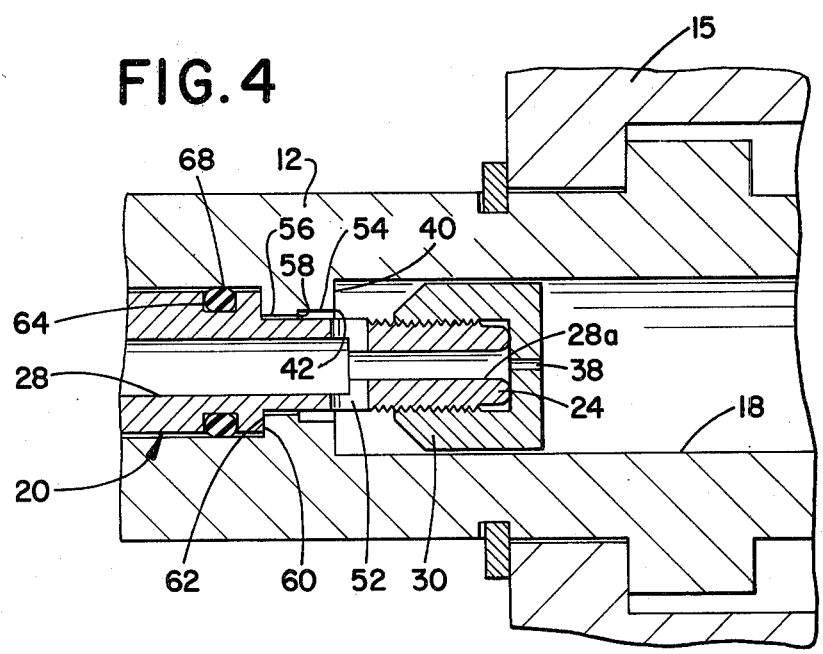

During opening movement of valve element 20, radial passageways 52 as mentioned above are displaced to the right in FIG. 2 such that the upstream ends of the radial passageways advance toward valve seat 42, ultimately reaching a point at which the downstream ends of the radial passageways are axially adjacent valve seat 42 in bore 18, as shown in FIG. 4 of the drawing. During such opening movement of valve element 20, shoulder 58 initially promotes the flow of gas radially into passageways 52 and, when fully open, shoulder 40 promotes radial flow into passageways 52. Accordingly, opening movement of valve element 20 is achieved with minimum restriction and, when fully open, the supply gas flows freely through passageways 52 into primary passageway 28 in the manner which minimizes any tendency for the valve to be flow sensitive.

Valve element 20 will remain open as long as the system is pressurized downstream thereof and the downstream pressure contributes a back force on the valve element which is of a magnitude greater than or equal to the force of spring 50.

Upon a drop in downstream pressure to a magnitude resulting in a back force less than the force of the spring, the spring will close the valve in preparation for a new cycle of operation. By providing for the full flow of gas past seat 42 and radially into primary flow passageway 28, the tendency of the flow of gas to close the valve element during full flow operation is advantageously minimized. Additionally, the normally closed valve element 20 advantageously prevents any free flow of gas to the regulator from the supply which, as in the case of a normally open valve, might flow to the regulator before the valve can close. Thus, the shock absorbing valve according to the present invention provides the desired protection for the regulator under varying operating pressure conditions and operates efficiently to achieve such protection without restricting proper functioning of the regulator.

As an example of the preferred embodiment herein illustrated and described, the desired operating characteristics are obtained with the following dimensions of the component parts. Housing 12 is made from brass and has a length of about 2.350 inches and a diameter of 0.552 to 0.562 inch. Bore 18 upstream from valve seat 42 has a diameter of from 0.281 to 0.286 inch, and valve seat 42 and surface 54 extending downstream therefrom have a diameter of 0.187 inch. Shoulder 40 is about 1.200 inches from the upstream end of housing 12. Surface 56 extending downstream from shoulder 58 has a diameter of from 0.166 to 0.169 inch, and surfaces 54 and 56 have respective axial dimensions of 0.060 and 0.065 inch. Shoulder 46 is about 0.656 inch from the downstream end of housing 12, and the portion of bore 18 extending upstream from shoulder 46 has a diameter of from 0.249 to 0.251 inch. The portion of bore 18 extending downstream from shoulder 46 has a diameter of 0.374 to 0.376 inch. Body portion 22 of valve element 20 is made from brass and has a length of about 1.253 to 1.258 inches. Downstream end 26 of body portion 22 has a diameter of from 0.370 to 0.372 inch, and the portion extending upstream from shoulder 44 to shoulder 62 has an outside diameter of from 0.245 to 0.247 inch. Upstream end portion 24 extending from shoulder 62 has an outside diameter from 0.157 to 0.163 inch. Primary flow passageway 28 has a diameter of 0.093 inch from the downstream end of body portion 22 toward the upstream end, and portion 28a of the flow passageway has a diameter of 0.047 inch and a length of about 0.275 inch from the upstream end of body portion 22. Radial passageways 52 are diametrically opposed, have axes spaced 0.275 inch from the upstream end of body portion 22 and are each of a diameter of 0.063 inch. Shoulder 62 is spaced about 0.425 inch from the upstream end of body portion 22. Valve head member 30 is made from brass and the upstream end thereof is hexagonal in cross section and has a dimension across the flats thereof of about 0.250 inch and a dimension across diametrically opposed corners thereof of no more than 0.280 inch. End wall 34 has an axial thickness of about 0.063 inch, and conical seating wall 36 is at an angle of 45° with respect to the axis of body portion 22. Valve head member 30 further has an axial length of 0.250 inch, and restricted passageway 38 has a diameter of 0.007 inch.

While considerable emphasis has been placed herein on the specific structure of the preferred embodiment of the pressure shock absorbing valve of the present invention, it will be appreciated that many changes can be made in the preferred embodiment without departing from the principles of the invention. In this respect, for example, valve element structures can readily by devised in which the head member would be integral with the body portion of the valve as opposed to being a separate member removably attached thereto as herein described. Further, biasing arrangements other than that disclosed herein can readily be devised for maintaining the valve element normally closed, and sealing arrangements other than O-rings carried by the valve element can be devised to seal against leakage between the valve element and housing bore. However, it is important in accordance with the present invention that the valve element be normally closed and, when open, that full flow of gas be through a primary flow passageway or passageways in the valve element to minimize the tendency of the valve element to close under full flow conditions, and that such tendency be opposed by internal pressure.

As many embodiments of the present invention may be made and as many changes may be made in the embodiment herein illustrated and described, it is to be distinctly understood that the foregoing descriptive matter is to be interpreted merely as illustrative of the present invention and not as a limitation.

Having thus described the invention it is claimed:

1. A fluid pressure shock absorbing valve comprising, a housing having a bore therethrough, said bore having upstream and downstream ends with respect to the direction of fluid flow, pressure responsive valve means slidable in said bore, said valve means having opposite ends and head means on one of said opposite ends, a seat in said bore engaged by said head means in the direction from said upstream end toward said downstream end to close said bore, means biasing said valve means to normally hold said head means against said seat, a flow passageway extending into said valve means from the other of said opposite ends toward said one end, a restricted passageway extending into said one end of said valve means and opening into said flow passageway to bleed fluid through said head means to said flow passageway when said head means engages said seat, radial passageway means in said valve means communicating said bore with said flow passageway downstream from said head means, and sealing means between said valve means and said bore downstream from said radial passageway means, said valve means including a body portion having upstream and downstream ends, said flow passageway extending through said body portion between said ends thereof, said head means being a head member mounted on said upstream end of said body portion and including a wall extending across said flow passageway at said upstream end of said body portion, and said restricted passageway being through said wall.

2. The valve according to claim 1, wherein said biasing means is spring means in said bore downstream of said seat.

3. The valve according to claim 1, wherein said sealing means includes resilient sealing ring means carried by said valve means in slidable sealing engagement with said bore.

4. The valve according to claim 1, wherein said head member is removably mounted on said body portion.

5. The valve according to claim 1, wherein said bore and said body portion of said valve means include axially opposed spaced apart shoulders and said biasing means is spring means between said shoulders.

6. The valve according to claim 5, wherein said spring means is a compression spring in said bore and surrounding said body portion of said valve means.

7. The valve according to claim 1, wherein said bore includes a circumferential wall downstream from and facing said seat, said wall being axially positioned to overlie said radial passageway means when said head means engages said seat.

8. The valve according to claim 1, wherein said body portion of said valve means includes circumferential recess means downstream from said radial passageway means and open toward said bore, said sealing means being resilient sealing ring means in said recess means.

9. The valve according to claim 8, wherein said bore and said body portion of said valve means include axially opposed spaced apart shoulders and said biasing means is spring means between said shoulders.

10. The valve according to claim 9, wherein said bore includes a circumferential wall downstream from and facing said seat, said wall being axially positioned to overlie said radial passageway means when said head means engages said seat.

11. A fluid pressure shock absorbing valve comprising, a housing having a bore therethrough, said bore having upstream and downstream ends with respect to the direction of fluid flow and having a first shoulder providing an annular valve seat between said ends, a pressure responsive valve slidable in said bore and having a head portion on the upstream side of said seat and a body portion extending from said head portion toward said downstream end of said bore and having a downstream end, said head portion engaging said seat in the direction from said upstream end toward said downstream end of said bore to close said bore, said body portion having a flow passageway therein extending from said downstream end of said body portion toward said head portion, said head portion having a restricted passageway therethrough opening into said flow passageway to bleed fluid through said head means to said flow passageway when said bore is closed, said body portion having radial passageways therein downstream from said head portion and communicating said bore with said flow passageway, said bore having a second shoulder downstream from said first shoulder, said body portion having a shoulder axially opposed with respect to said second shoulder and spaced downstream therefrom, spring means between said second shoulder and said shoulder on said body portion normally biasing said head portion against said seat, and resilient sealing ring means carried by said body portion and slidably engaging said bore between said first and second shoulders.

12. The valve according to claim 11, wherein said bore includes a circumferential wall downstream from and facing said seat, said wall being axially positioned to overlie said radial passageways when said head portion engages said seat.

13. The valve according to claim 11, and second resilient sealing ring means carried by said body portion downstream from said shoulder thereon and slidably engaging said bore.

14. The valve according to claim 13, wherein said shoulder on said body portion and said second shoulder in said bore provide a radial space extending circumferentially about said body portion, said spring means being a coiled compression spring in said bore surrounding said body portion in said radial space.

15. The valve according to claim 14, wherein said head portion is a head member removably mounted on said body portion.

16. The valve according to claim 15, wherein said bore includes a circumferential wall downstream from and facing said seat, said wall being axially positioned to overlie said radial passageways when said head portion engages said seat.

* * * * *